United States Patent Office 3,087,969
Patented Apr. 30, 1963

3,087,969
METHOD FOR PURIFYING AROMATIC COMPOUNDS
Alexander H. Widiger, Jr., Midland, Mich., assignor to The Dow Chemical Company, Midland, Mich., a corporation of Delaware
No Drawing. Filed Mar. 29, 1961, Ser. No. 99,024
8 Claims. (Cl. 260—620)

The present invention relates to a new and useful method for purifying aromatic compounds and is more particularly concerned with a new method for purifying aromatic compounds synthetically prepared having the following generic formula:

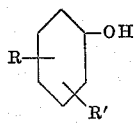

wherein R represents lower alkyl, phenyl or alkyl phenyl and R' represents hydrogen or lower alkyl. This class of compounds will hereinafter be referred to as "phenols."

In the manufacture of phenols wherein the phenolic hydroxyl is introduced by the caustic hydrolysis of aryl chloride, a number of impurities carry over with the desired product. Various methods have been proposed to remove these substances since they discolor the phenol product especially when the product is in the salt form as the sodium salt, and render it unstable to light and storage. Some of the proposed methods have stabilized the phenols sufficiently to be used commercially. However, none have completely removed the impurities. Repeated and laborious purification steps are necessary to obtain the phenol in a stable form. One of the more common methods, crystallization, is expensive to employ commercially on a large scale. Therefore, it would be desirable to provide an inexpensive method to purify phenols.

It is an object of the present invention to provide a novel process for the purification of the synthetic phenols produced by the caustic hydrolysis of arylchlorides which yield a product stable to discoloration from light or storage. A further object of the present invention is the provision of a method for the purification of the desired product which process is of a less corrosive nature than the present day methods. These and other objects will become apparent to those skilled in the art from the following specification and claims.

It has now been found that a synthetic phenol one stage of which is derived in the arylchloride caustic process, can be purified by the alkaline oxidation of the crude product. The process reduces the impurities of which little is known as to their identity, to tar-like residues which can be separated from the phenol thereby to produce a light-stable, color-stable product of high chemical purity. The separation of the phenol can be accomplished readily and conveniently from the tars and other impurities by vacuum distillation and the like. Good results have been obtained when the crude synthetic phenol is treated with an aqueous caustic solution at a temperature of from about 60° to 120° C. and air or other oxygen-containing gas is blown through at between about 20 and about 100 p.s.i., to provide from about 0.05 to 2 cubic feet of oxygen per pound of the phenol.

Some of the phenols which can be purified in accordance with the present invention are o-phenylphenol, p-phenylphenol, p-sec.-butylphenol, p-tert.-butylphenol, p-cresol, o-cresol, di-t.-butylphenol, phenol and the like, prepared by the reaction of the corresponding chloroaryl compound with sodium hydroxide.

The alkaline conditions conveniently can be obtained be employing substantially any water-soluble alkali, particularly sodium hydroxide. Other alkalies which can be employed are, for example, potassium hydroxide, sodium carbonate, potassium carbonate, and the like. The concentration of the alkali in the reaction mixture is from 0.1 to about 2 percent by weight of the crude phenol.

The preferred oxygen containing gas is air; however, it is to be understood that pure oxygen or any other oxygen containing gas can be employed and that the rate of introduction and the amount are adjusted to supply oxygen at the rate herein before set forth.

The following examples are illustrative of the present invention but are not to be construed as limiting.

EXAMPLE 1

16,300 pounds of crude ortho-phenylphenol, prepared by the caustic-chlorobenzene process, was mixed with 120 pounds of flake caustic and 1,500 pounds of water. The resulting mixture was heated to between 95° and 105° C. and 45.6 cubic feet of air per minute (calculated at standard pressure and temperature) was passed through the solution for eight hours. The pressure in the reactor was 40–50 p.s.i.g. Upon completion of this operation the reaction mixture was fractionally distilled under reduced pressure to obtain 83.4 percent of the starting crude phenol product as a purified ortho-phenylphenol having a freezing point of 57° C. and a boiling point of 165° C. at 25 ml. pressure. The product obtained was found to be superior in color and light stability as compared against a control of ortho-phenylphenol which was not oxidized but purified by distillation.

EXAMPLES 2–8

A crude phenol, prepared by the caustic-chlorobenzene process, containing from .7 to 1.5 percent by weight of alkali and from 5.7 to 13.0 percent water was heated at 90° C. under pressure. During the heating, air was introduced in a manner to bubble through the reaction mixture. The air was maintained at 40 to 50 lbs. per square inch, gauge, and regulated to introduce about 0.18 cubic feet, per hour, per pound of phenol. The reaction was continued for 6 hours.

Table 1

| Ex. No. | Compound | Method[1] | Compounds, weight in grams | | Amt. H₂O, ml. | Still | | | | | Results of days exposed expressed as color change in Na salt | |
|---|---|---|---|---|---|---|---|---|---|---|---|---|
| | | | | | | Load, grams | Top cut gms. | Main cut gms. | Residue | | | |
| | | | Crude | NaOH | | | | | gms. | Percent | Days | Color |
| 2 | p-Sec-butylphenol | O | 194 | 3.0 | 25 | 194 | 34.0 | 135.5 | 23.3 | 12 | 11 | L. yellow. |
| 3 | do | C | 104.8 | 0 | 0 | 104.8 | 7.5 | 90.5 | 4.2 | 4 | 11 | L. green. |
| 4 | p-Cresol | O | 300 | 3.0 | 25 | 302.5 | 41.1 | 241.1 | 19.5 | 6.4 | 12 | V. sl. yellow. |
| 5 | do | C | 302 | 0 | 0 | 302 | 16.9 | 241.5 | 42.2 | 14.0 | 12 | Orange-pink. |
| 6 | p-t-butylphenol | O | 252.2 | 3.0 | 25 | 194.2 | 27 | 135.7 | 28.1 | 14.5 | 46 | Dk. yellow. |
| 7 | do | C | 253.0 | 0 | 0 | 253.0 | 32.8 | 211.8 | 7.8 | 3.1 | 46 | V. dk. yellow. |

[1] O—oxidized, C—control.

EXAMPLES 9–13

In the manner of Examples 2–8 various of the phenols made by the chlorobenzene process were purified. The purified phenols were subjected to a color stability test. The results of the operations are set forth in the following table.

*Table II*

| Ex. No. | Compound | Method[1] | Compound, Weight in grams | | Amt. H₂O ml. | Still | | | | | Result of days exposed expressed of free as color changing phenol | |
|---|---|---|---|---|---|---|---|---|---|---|---|---|
| | | | Crude | NaOH | | Load, grams | Top cut, gms. | Main cut, gms. | Residue | | Days | Color |
| | | | | | | | | | gms. | Percent | | |
| 8 | di-t-butylphenol | O | 436 | 3.0 | 25 | 309.2 | 22 | 129.5 | 157 | 50.7 | 42 | Orange. |
| 9 | do | C | 302.4 | 0 | 0 | 302.4 | 24.7 | 241.1 | 35.5 | 11.7 | 42 | Sl. dk. orange. |
| 10 | o-Cresol | O | 228.6 | 2.0 | 25 | 228.0 | 30.8 | 166.9 | 30.3 | 13.2 | 38 | White. |
| 11 | do | C | 154.6 | 0 | 0 | 154.6 | 16.6 | 122.0 | 14.6 | 9.45 | 38 | Straw. |

[1] O—oxidized, C—control.

This application is a continuation-in-part of my copending application, Serial No. 796,272, filed March 2, 1959, and now abandoned.

I claim:

1. A method for removing the color forming impurities from nuclear substituted phenols prepared by the caustic hydrolysis of arylchloride which comprises treating the crude phenol having the formula

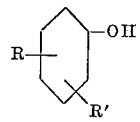

wherein R represents a member selected from the group consisting of lower alkyl radicals having from 1 to 4 carbon atoms, phenyl and alkyl phenyl and R′ represents a member selected from the group consisting of hydrogen and lower alkyl radicals, with an oxygen-containing gas in an amount to provide from 0.05 to about 2 cubic feet of oxygen per pound of phenol and at a temperature of from about 60° to about 120° C., in the presence of an aqueous solution of from about 0.1 to 2 percent by weight based on the phenol of an alkali selected from the group consisting of carbonates and hydroxides of alkali metals.

2. A method as set forth in claim 1 wherein the oxygen-containing gas is air and is supplied in an amount sufficient to provide from about 0.05 to about 2 cubic feet of oxygen per pound of phenol and at a pressure from 20 to 100 pounds per square inch.

3. A method for purifying ortho-phenylphenol to remove the color forming impurities produced in the manufacture of the phenol by the caustic hydrolysis of chlorobenzene which comprises treating the impure orthophenylphenol with an oxygen-containing gas in an amount sufficient to provide from 0.05 to about 2 cubic feet of oxygen per pound of phenol at a temperature of about 60° to 120° C. in the presence of an aqueous solution of from 0.1 to 2 percent by weight based on the phenol of the phenol of an alkali selected from the group consisting of hydroxides and carbonates of the alkali metals.

4. The method of claim 1 wherein said phenol is p-sec-butylphenol.

5. The method of claim 1 wherein said phenol is p-cresol.

6. The method of claim 1 wherein said phenol is p-t.-butylphenol.

7. The method of claim 1 wherein said phenol is di-t.-butylphenol.

8. The method of claim 1 wherein said phenol is phenylphenol.

References Cited in the file of this patent

UNITED STATES PATENTS

| 2,394,652 | Alves et al. | Feb. 9, 1946 |
| 2,829,176 | Clough | Apr. 1, 1958 |
| 2,885,444 | Fookes et al. | May 5, 1959 |

FOREIGN PATENTS

| 619,856 | Great Britain | Mar. 19, 1949 |